United States Patent
Jenkins et al.

(10) Patent No.: US 6,463,588 B1
(45) Date of Patent: *Oct. 8, 2002

(54) METHOD AND APPARATUS FOR RESTORING PORT STATUS IN A CABLE TELEVISION TAP

(75) Inventors: Joel P. Jenkins, Lawrenceville, GA (US); Jaegyoo Seol, Lilburn, GA (US); Sou-Pen Su, Lawrenceville, GA (US)

(73) Assignee: Scientific-Atlanta, Inc., Lawrenceville, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/168,709

(22) Filed: Oct. 8, 1998

(51) Int. Cl.⁷ ............................................... H04N 7/173
(52) U.S. Cl. ...................... 725/127; 725/105; 725/107; 348/192
(58) Field of Search .................. 725/115, 118, 725/127; 348/192, 193

(56) References Cited

U.S. PATENT DOCUMENTS

| | | | |
|---|---|---|---|
| 4,343,042 | * 8/1982 | Schrock et al. | |
| 4,367,557 | * 1/1983 | Stern et al. | |
| 5,133,081 | * 7/1992 | Mayo | |
| 5,353,327 | * 10/1994 | Adari et al. | |
| 5,557,257 | * 9/1996 | Gieffers | |
| 5,675,371 | * 10/1997 | Barringer | |
| 5,764,076 | * 6/1998 | Iee et al. | |
| 5,767,894 | * 6/1998 | Fuller et al. | |
| 5,818,512 | * 10/1998 | Fuller | |
| 6,072,984 | * 6/2000 | Barringer | |
| 6,130,703 | * 10/2000 | Spriester et al. | ............ 725/127 |

* cited by examiner

*Primary Examiner*—Andrew Faile
*Assistant Examiner*—Kieu-Oanh Bui
(74) *Attorney, Agent, or Firm*—Hubert J. Barnhardt, III; Kenneth M. Massaroni; Shelley L. Couturier

(57) ABSTRACT

A communication system (100) includes a tap (120) that has an input port (202) for receiving a signal and output ports (225) coupled to the input port (202) for providing the signal to subscriber equipment (125). Each of the output ports (225) has a programmed status comprising either an enabled status or a disabled status. After the statuses have been programmed and the output ports (225) have been set, a controller (210) coupled to the output ports (225) periodically restores the programmed status of the output ports (225) after programmed period of time, thereby automatically resetting inadvertent status changes.

16 Claims, 3 Drawing Sheets

METHOD AND APPARATUS FOR RESTORING PORT STATUS IN A CABLE TELEVISION TAP

FIELD OF THE INVENTION

This invention relates generally to cable television taps, and more specifically to taps with ports having programmable statuses.

BACKGROUND OF THE INVENTION

Cable television (CATV) systems typically include headend equipment that receives satellite signals and demodulates the signals to baseband. The baseband signal is then converted to an optical signal for transmission from the headend equipment to subscriber equipment owned by subscribers of CATV services. Taps are situated along the CATV distribution system to split the signals off to the subscriber equipment.

Cable taps usually include a single incoming port for receiving a radio frequency (RF) signal and a number of outgoing ports for splitting off portions of the RF signal. The outgoing ports can be enabled and disabled remotely or locally, such as when a service person physically couples a coaxial cable from a previously inactive port to a home, thereby activating the port. When remote activation is used, inactive ports can already be physically connected to homes or offices that do not currently subscribe. When an inactive port is to later be activated, a programming signal can be transmitted to the tap instructing the tap to enable a particular port, such as by providing an electrical connection to the selected port via a switch.

However, tap functions, such as port status, can be inadvertently changed by environmental factors. For instance, a nearby lightning strike, a hard blow, or loss of power can sometimes cause an enabled tap port to become disabled, and vice versa. In conventional cable television systems, this cannot be corrected until a subscriber calls in to report that he is not receiving cable service or until a cable service technician notices that a non-subscriber is receiving cable service, in which case the port is reprogrammed by transmitting a new programming signal or sending out a technician for tap adjustment.

Thus, what is needed is a better way to correct inadvertent status changes for outgoing ports of a cable television tap device.

DETAILED DESCRIPTION OF A PREFERRED EMBODIMENT

Figure 1:
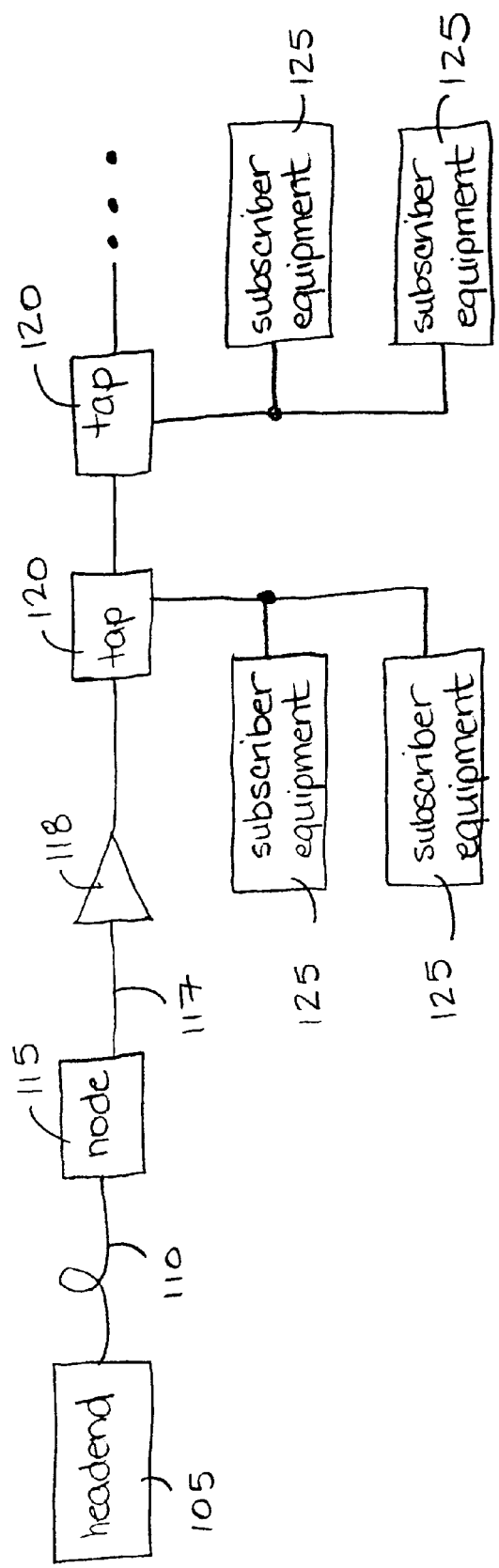
FIG. 1 is an electrical block diagram of a communication system, such as a cable television system.

Referring to FIG. 1, a communication system, such as a cable television (CATV) system 100, is shown. The CATV system 100 includes a transmitter, which is usually referred to as headend equipment 105, for receiving satellite television signals, demodulating the signals down to baseband, and transmitting the signals over the CATV system 100. The transmitted signals can, for instance, be radio frequency (RF) signals, although they are more preferably optical signals that are transmitted over a communication medium such as fiber optic cable 110. When optical signals are transmitted by the headend equipment 105, one or more nodes 115 are included in the system 100 for converting the optical signals to RF signals that are thereafter routed over other communication media, such as coaxial cables 117. Distribution amplifiers 118 are often situated along the distribution system for amplifying the signals within the system 100.

As mentioned briefly in the Background of the Invention, taps 120 are provided within the CATV system 100 for splitting the RF signal off to receiving equipment, i.e., subscriber equipment 125, in the homes or offices of system subscribers. More particularly, each tap 120 receives an incoming signal at an input port and routes the signal to subscriber equipment 125 via an output port that has been previously enabled to forward the signal. Each tap 120 can include various numbers of subscriber output ports, depending upon the number of system subscribers to be coupled to the tap 120. For example, when eight subscribers can be possibly coupled to a particular tap, that tap includes eight output "subscriber" ports, as well as the main output port that routes the cable signal to further devices within the CATV system 100.

Subscriber ports of a tap 120 are either disabled, so that a signal is not transmitted from that port, or enabled for transmission. A subscriber port of a tap 120 can, for instance, be manually enabled, such as when a cable service person physically visits the tap location to connect a cable from a system subscriber to the port, thereby activating cable service. Newer CATV systems 100 can also include addressable taps, subscriber ports of which can be enabled and disabled through the use of programming signals sent from the headend equipment 105 over the communication media 110, 117 to a tap 120. In this case, the headend equipment 105 typically includes a programming section that provides the programming signals in response to prompts entered by a human operator. It will be appreciated that the main output port of the tap 120 typically remains active at all times.

Figure 2:
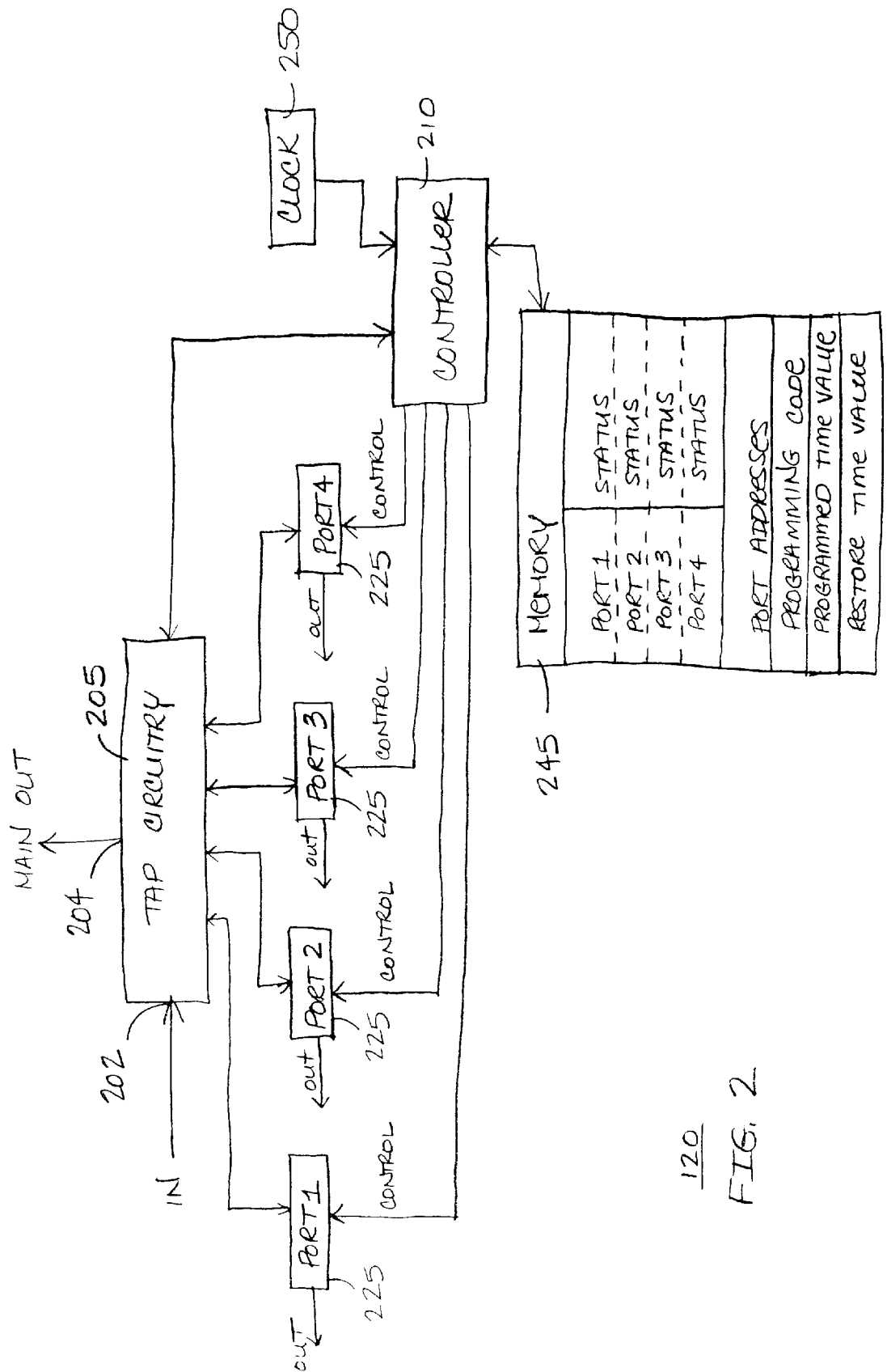
FIG. 2 is an electrical block diagram of a tap included in the communication system of FIG. 1 in accordance with the present invention.

FIG. 2 is an electrical block diagram of a tap 120 included in the CATV system 100. As previously described, the tap 120 includes an input port 202 for receiving an incoming signal, a main output port 204 for continued routing of the signal, and output subscriber ports 225 (shown as PORT1, PORT2, PORT3, and PORT4) for providing outgoing signals to subscriber equipment 125 when enabled. The incoming signal can be processed by tap circuitry 205 in a conventional manner to provide outgoing RF signals to enabled ones of the output subscriber ports 225. The tap 120 further includes a controller 210 coupled to the tap circuitry 205 for processing commands provided by the headend equipment 105 (FIG. 1) in the form of programming signals and programming commands.

Programming commands directed to the tap 120 can be recognized by reception of a known port address and a programming code within an incoming signal. When, for instance, a particular port is to be enabled, the incoming signal can include the subscriber port address of the port to be enabled, a programming code indicating that the signal is a programming command, and status information indicative of whether the addressed port is to be enabled or disabled. Alternatively, the programming code itself could be indicative of the desired port status, i.e., enabled or disabled. It will also be appreciated that a programming command could instead include a general tap address, the programming code, and a port number corresponding to the subscriber port to be enabled or disabled. The controller 210 then directs the tap circuitry 205 to close a switch (not shown) coupled to the addressed port to enable the port or to electrically open a switch coupled to the addressed port to disconnect the addressed port from the outgoing signal.

A memory 245, such as a random access memory, is also included in the tap 120 for storing operational parameters, such as the subscriber port addresses (or a general tap address and port codes, values, or other indicators), any programming codes, and indications of the statuses of the output subscriber ports 225. The status information can, for example, be indicated by bits set to particular values, e.g., ones or zeros, or other recognizable codes. In response to activation or deactivation of a port, the controller 210 preferably sets the status information corresponding to the activated port to indicate its updated status in the memory 245.

In the present tap 120, as in prior art taps, the correct enabled or disabled status of a subscriber port 225 can be inadvertently changed by various environmental conditions. For example, a bolt of lighting or a sharp blow to the tap can reset the port switch so that it defaults to a status contrary to that which has been previously programmed. In such a situation, a subscriber may lose service, or a non-subscriber may receive cable service, and this condition cannot always be corrected in a timely manner. When, for instance, a storm has caused service to be lost to a large number of subscribers, a relatively long time could pass before a subscriber's port is reprogrammed. If that same storm has caused a non-subscriber to receive service, an even longer time may pass before the port is reset, since that non-subscriber may not ever complain to the service provider about reception of "free" services.

The tap 120 according to the present invention conveniently solves this problem by periodically refreshing, or restoring, the proper status of each output port 225. Preferably, the memory 245 stores a programmed time value that is indicative of a time period after which port statuses should be restored. Additionally, the tap 120 includes a clock 250, which can comprise conventional timing circuitry, coupled to the controller 210 for generating time values. A "restore" time value can also be set in the memory 245 by the controller 210 to assist in the determination of when to restore the port statuses, as will be explained in greater detail below.

Figure 3:
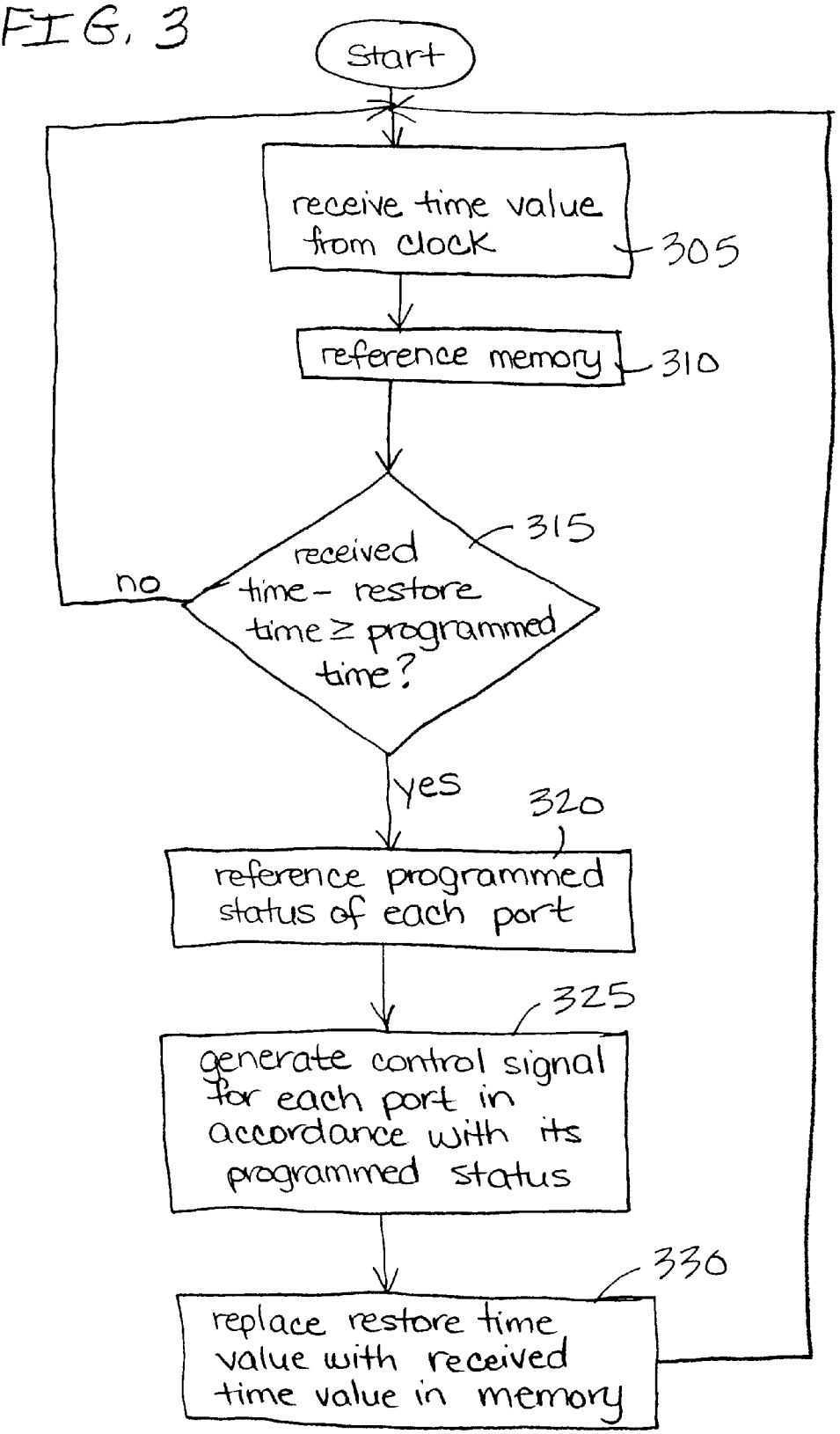
FIG. 3 is a flowchart of an operation performed by a controller included in the tap of FIG. 2 in accordance with the present invention.

Referring next to FIG. 3, a flowchart illustrates an operation of the controller 210, which, at step 305, receives a current time value from the clock 250 and, at step 310, references the memory 245. At step 315, the controller 210 determines whether the periodic time for restoring port statuses has expired. This can be done, for instance, by comparing the received current time value to the stored restore time value to determine if the difference between the current time and the restore time is greater than or equal to the programmed time. If so, i.e., if the periodic time has expired, the controller 210 further references, at step 320, the stored programmed status of each subscriber output port 225. Thereafter, the controller 210 generates, at step 325, appropriate control signals for transmission to each port 225 over a control line coupled thereto. The controller 210 also, at step 330, replaces the stored restore time value with the currently received time value in the memory 245 to effectively start the programmed "restore" time period over again.

As described above, the controller 210 periodically sends out control signals to each of the subscriber ports 225 to ensure that the port 225 is programmed as indicated by the memory 245. This periodic reprogramming occurs regardless of whether any new programming commands have been received from the headend equipment 05 or whether a technician has recently programmed the port statuses. Since the periodic refreshing of port status occurs automatically at regular intervals, inadvertent port status changes can be quickly and easily corrected without intervention by the subscriber or by the cable service provider. As a result, the likelihood and duration of service outages and provision of services to non-subscribers are advantageously minimized.

Although the controller 210 preferably sends out periodic restore signals regardless of port status, it will be appreciated that, when the programmed time period expires, the controller 210 could alternatively check the ports 225 to determine which had become deprogrammed since the last status check. This could be done, for instance, by measuring the voltage of the switch (not shown) at each subscriber port to determine whether the switch was open or closed, then referencing the memory 245 to determine whether the switch status accurately reflected the programmed port status. If so, no control signal would have to be sent. If the switch was set incorrectly, a control signal could be provided to correct the switch status, and thus the port status.

In practice, both a random access memory (RAM) and a non-volatile memory (NVM) could be included within the tap 120, with port statuses stored in each memory. In this manner, the statuses stored in the RAM and the port status itself could be easily corrected after loss of power, based on the statuses reflected in the NVM. Additionally, timing functions could be provided by a sixteen-bit counter included in a microprocessor, which could perform controller operations. With a four (4) megahertz crystal oscillator, the timer would have a two (2) microsecond resolution and, in order to extent the timing capabilities beyond the sixteen-bit range, a timer overflow interrupt could be used to implement the periodic restoring feature of the present invention. The timer would overflow every one hundred and thirty one (131) milliseconds. The device would count the number of timer overflows, and, when the counter equals the predetermined restore time count, the device would start to restore the port statuses beginning with the first port, until the last port is restored within the 131 milliseconds. The 131 millisecond time period between port status restoration could be used to conveniently reduce the device block time from the headend controller. After all ports were restored, the sequence could begin again.

In summary, the tap as described above includes output ports that can be either enabled or disabled. Periodically, the port status, i.e., enabled or disabled, of each port is restored. In other words, the controller of the tap periodically references the memory to determine the programmed port status, then sends a control signal to the port indicating the programmed port status. In this manner, ports that have reverted to a default mode or been inadvertently and incorrectly changed in status are automatically reprogrammed correctly within a minimal amount of time.

What is claimed is:

1. A tap for use in a communication system, the tap comprising:

an input port for receiving a signal;

ports coupled to the input port for providing the signal to subscriber equipment, the ports each having a programmed status comprising an enabled status or a disabled status;

a memory for storing the programmed status of each of the ports;

programming means coupled to the memory for storing the programmed status of each of the ports in the memory; and a controller coupled to the ports for periodically restoring the programmed status of the ports after a period of time, wherein the controller restores the programmed status based on information stored in the memory, wherein the memory stores a programmed time value indicative of the period of time after which the controller is to restore the programmed status.

2. The tap of claim 1, further comprising:

a clock for providing time values, wherein the controller references the clock to determine when to restore the programmed status of the ports.

3. The tap of claim 1, wherein each of the ports is associated with a port address, and wherein the programming means comprises:

the input port for receiving a programming command for programming the port status.

4. The tap of claim 3, wherein the programming command comprises:

a programming code that identifies received information as the programming command;

at least one port address associated with at least one port; and status information indicative of the programmed status, wherein, in response to reception of the programming command, the controller writes the programmed status into the memory and sets the at least one port associated with the at least one port address in accordance with the programmed status.

5. The tap of claim 4, wherein, in response to reception of the programming command, the controller enables an addressed port in response to the status information indicating the enabled status, and the controller disables an addressed port in response to the status information indicating the disabled status.

6. A communication system for providing signals, the communication system comprising:

a transmitter for transmitting the signals;

a tap coupled to the transmitter for splitting off a portion of the signals; and receiving equipment coupled to the tap for receiving the portion of the signals, wherein the tap comprises:

an input port for receiving the signals from the transmitter;

first and second output ports coupled to the input port for providing the portion of the signals to the receiving equipment, the first and second output ports each having a programmed status comprising an enabled status or a disabled status;

a memory for storing the programmed status of each of the first and second output ports;

programming means coupled to the memory for storing the programmed status of each of the first and second output ports in the memory; and a controller coupled to the first and second output ports for periodically restoring the programmed status of the first and second output ports after a period of time, wherein the controller restores the programmed status based on information stored in the memory, and wherein the memory of the tap stores a programmed time value indicative of the period of time after which the controller is to restore the programmed statuses.

7. The communication system of claim 6, wherein the transmitter comprises headend equipment.

8. The communication system of claim 6, wherein the receiving equipment comprises subscriber equipment.

9. The communication system of claim 6, wherein the communication system comprises a cable television system.

10. The communication system of claim 6, wherein the tap further comprises:

a clock for providing time values, wherein the controller references the clock to determine when to restore the programmed statuses of the first and second output ports.

11. The communication system of claim 6, wherein the first and second output ports of the tap are respectively associated with first and second port addresses, and wherein the programming means comprises:

the input port for receiving a programming command for programming the port status.

12. The communication system of claim 11, wherein the programming command comprises:

a programming code that identifies received information as the programming command;

at least one of the first and the second port addresses to indicate an addressed port; and status information indicative of the programmed status for the addressed port, wherein, in response to reception of the programming command, the controller writes the programmed status of the addressed port into the memory and sets the addressed port in accordance with the programmed status.

13. A method in a tap for use in a communication, the tap comprising output ports, each of which is associated with a programmed status, and a controller for setting statuses of the output ports in accordance with the programmed statuses, the method comprising the steps of:

receiving at least one programming command indicative of the programmed statuses;

storing the programmed statuses in a memory of the tap;

setting the statuses of the output ports in accordance with the at least one programming command;

determining that a programmed period of time has expired, wherein the determining step comprises the steps of:

receiving a current time value from a clock included in the tap;

referencing a stored programmed time value, indicative of the programmed period of time, and a stored restore time value, indicative of a previous time at which the controller previously restored the programmed statuses of the output ports; and restoring the programmed statuses of the output ports in response to determining that the difference between the current time value and the restore time value is greater than or equal to the programmed time value; and restoring each output port to its programmed status in response thereto.

14. The method of claim 13, wherein the restoring step occurs regardless of whether the programmed statuses of the output ports have been reprogrammed.

15. The method of claim 13, wherein the determining and restoring steps occur regardless of whether further programming commands have been received.

16. The method of claim 13, wherein the restoring step comprises the step of sending control signals to the ports indicative of the programmed statuses.

* * * * *

UNITED STATES PATENT AND TRADEMARK OFFICE
CERTIFICATE OF CORRECTION

PATENT NO.    : 6,463,588 B1
DATED         : October 8, 2002
INVENTOR(S)   : Jenkins et al.

It is certified that error appears in the above-identified patent and that said Letters Patent is hereby corrected as shown below:

Column 4,
Line 4, delete "05" and insert therefore -- 105 --

Signed and Sealed this

Second Day of September, 2003

JAMES E. ROGAN
*Director of the United States Patent and Trademark Office*